(12) United States Patent
Niwa et al.

(10) Patent No.: US 10,415,458 B2
(45) Date of Patent: Sep. 17, 2019

(54) VEHICLE WITH TURBOCHARGED ENGINE

(71) Applicant: Mazda Motor Corporation, Aki-gun, Hiroshima (JP)

(72) Inventors: Yasushi Niwa, Higashihiroshima (JP); Mitsuhiro Nakajima, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 104 days.

(21) Appl. No.: 15/489,541

(22) Filed: Apr. 17, 2017

(65) Prior Publication Data

US 2017/0314457 A1    Nov. 2, 2017

(30) Foreign Application Priority Data

Apr. 28, 2016 (JP) .................. 2016-090152

(51) Int. Cl.
*F02B 37/00* (2006.01)
*F02B 37/013* (2006.01)
(Continued)

(52) U.S. Cl.
CPC .......... *F02B 37/002* (2013.01); *F02B 37/004* (2013.01); *F02B 37/013* (2013.01);
(Continued)

(58) Field of Classification Search
CPC .... F02B 37/013; F02B 37/004; F02B 37/002; F02B 39/14
(Continued)

(56) References Cited

U.S. PATENT DOCUMENTS

| 4,977,743 A * | 12/1990 | Aihara | F01P 7/026 123/41.31 |
| 4,993,228 A * | 2/1991 | Tashima | F02B 29/00 60/602 |

(Continued)

FOREIGN PATENT DOCUMENTS

| JP | 62107221 A * | 5/1987 |
| JP | 2003056352 A * | 2/2003 |

(Continued)

OTHER PUBLICATIONS

JP 2003056352 A English Translation (Feb. 2003).*
JP 2010281282 A English Translation (Dec. 2010).*

*Primary Examiner* — Jason D Shanske
*Assistant Examiner* — Jessica L Kebea
(74) *Attorney, Agent, or Firm* — Alleman Hall Creasman & Tuttle LLP

(57) ABSTRACT

A vehicle with a turbocharged engine, including an engine body, an intake passage, an exhaust passage, a turbocharger, and a radiator. The radiator is provided with a cooling unit for cooling an engine coolant, and an upper tank into which the coolant is introduced after cooling the engine body. The turbocharger is provided with a turbine provided to the exhaust passage, a compressor provided to the intake passage, a coupling shaft coupling the turbine to the compressor, and bearings supporting the coupling shaft. The turbine is provided with an impeller for being rotated by introduced exhaust gas, and a turbine casing. The turbocharger is oil-cooled, and cooled by a lubricant. The turbine casing is formed from a sheet metal. The coupling shaft extends horizontally, and a height of an axial center of the shaft is above a height of an upper end of the upper tank of the radiator.

4 Claims, 5 Drawing Sheets

(51) Int. Cl.
  *F02B 37/18* (2006.01)
  *F02B 39/14* (2006.01)
  *F01M 11/00* (2006.01)
  *F02B 39/00* (2006.01)
  *F01M 11/02* (2006.01)

(52) U.S. Cl.
  CPC ............ *F02B 37/18* (2013.01); *F02B 39/005* (2013.01); *F02B 39/14* (2013.01); *F01M 2011/021* (2013.01); *Y02T 10/144* (2013.01)

(58) Field of Classification Search
  USPC .............................. 60/605.3, 612; 123/41.1
  See application file for complete search history.

(56) References Cited

U.S. PATENT DOCUMENTS

| | | | |
|---|---|---|---|
| 8,590,306 B2 | 11/2013 | Niwa et al. | |
| 2003/0159442 A1* | 8/2003 | Huter | F01D 17/105 60/612 |
| 2011/0180026 A1* | 7/2011 | Heusler | F01D 25/14 123/41.44 |
| 2013/0269341 A1* | 10/2013 | Kurata | F02B 37/004 60/605.2 |
| 2015/0007563 A1* | 1/2015 | Wade | F02C 6/12 60/605.2 |
| 2018/0283266 A1* | 10/2018 | Niwa | F02B 37/004 |

FOREIGN PATENT DOCUMENTS

| | | | |
|---|---|---|---|
| JP | 2010281282 A | * | 12/2010 |
| JP | 5494294 B2 | | 5/2014 |

* cited by examiner

VEHICLE WITH TURBOCHARGED ENGINE

BACKGROUND

The present invention relates to a vehicle with a turbocharged engine.

Conventionally, turbochargers have been provided to vehicles in order to increase an engine output.

The turbocharger is comprised of a turbine provided to an exhaust passage, a compressor provided to an intake passage, and a coupling shaft coupling the turbine to the compressor, and is configured to transmit rotation of the turbine to the compressor via the coupling shaft. The coupling shaft rotates at a high speed while receiving heat from the turbine through which hot exhaust gas passes, and thus it is necessary to fully cool the coupling shaft and bearings that support the coupling shaft.

JP5494294B2 discloses a vehicle with a turbocharged engine, where engine coolant is supplied into a casing which accommodates a coupling shaft of a turbocharger. The casing that accommodates the coupling shaft communicates with a water jacket formed in an engine body, and the engine coolant cooled by a radiator is supplied into the casing via the water jacket. The casing also communicates with an upper tank of the radiator, and the engine coolant after it cooled bearings which support the coupling shaft flows into the upper tank, and then flows back to the radiator.

Since the engine coolant is boiled at a relatively low temperature near 100° C., the structure in which the turbocharger is cooled by the engine coolant as disclosed in JP5494294B2 may generate steam inside the casing where the engine coolant is supplied, soon after the engine is stopped after a turbocharged operation. When the steam accumulates inside the casing, this makes an introduction of fresh engine coolant difficult and the bearings of the coupling shaft may not be fully cooled. If the steam is to be discharged from the casing in the vehicle disclosed in JP5494294B2, the height of the vertical center of the casing, i.e., the height of the axial center of the coupling shaft, must be located below an upper end of the upper tank of the radiator. Thus, even if a water pump that forcibly circulates the engine coolant is stopped in response to the engine stop, the hot engine coolant and the steam move upwardly by free convection, and are then discharged from the upper tank of the radiator, while cold coolant flows into the space around the bearings to prevent the bearings from seizing (galling). However, the space below the turbocharger becomes smaller around the engine body, resulting in a lesser degree of freedom in the engine layout.

SUMMARY

The present invention is made in view of the above issues, and provides a vehicle with a turbocharged engine, which increases a degree of freedom in a layout around an engine body, while suitably cooling the turbocharger.

According to one aspect of the invention, a vehicle with a turbocharged engine is provided, which includes an engine body where a cylinder is formed, an intake passage where intake air to be introduced into the engine body flows, an exhaust passage where exhaust gas discharged from the engine body flows, a turbocharger for boosting the intake air supplied to the engine body, and a radiator for cooling engine coolant for cooling the engine body. The radiator is provided with a cooling unit for cooling the engine coolant, and an upper tank provided to an upper part of the cooling unit and into which the engine coolant is introduced after cooling the engine body. The turbocharger is provided with a turbine provided to the exhaust passage, a compressor provided to the intake passage, a coupling shaft coupling the turbine to the compressor, and bearings supporting the coupling shaft. The turbine is provided with an impeller for being rotated by introduced exhaust gas, and a turbine casing accommodating the impeller. The turbocharger is oil-cooled, and cooled by a lubricant. The turbine casing is formed from a sheet metal. The coupling shaft of the turbocharger extends horizontally, and a height of an axial center of the coupling shaft is above a height of an upper end of the upper tank of the radiator.

In this vehicle, the turbine casing of the turbocharger is formed from the sheet metal so that the heat capacity thereof is lower than for cast iron. Accordingly, since the quantity of heat mainly transmitted from the turbine casing to the bearings immediately after the engine is stopped is significantly reduced, an excessive temperature rise of the bearings is controlled without supplying engine coolant to the bearings. In addition, while the engine is in operation, the bearings is suitably cooled by the lubricant, and the excessive temperature rise of the bearings is controlled. In addition, since the excessive temperature rise of the bearings is controlled, it is not necessary to locate the axial center of the coupling shaft below the upper end of the upper tank of the radiator. Therefore, the bearings of the turbocharger are suitably cooled, while the turbocharger is disposed at a relatively high location so that the height of the axial center of the coupling shaft is above the upper end of the upper tank. Accordingly, a larger space is secured below the turbocharger around the engine body, and thus a degree of freedom in an engine layout increases.

The turbocharger may be disposed behind the engine body, and the engine body may be mounted on the vehicle in a posture so that an upper part of a center axis of the cylinder inclines rearwardly.

In this vehicle, the turbocharger is disposed at the relatively higher position with respect to the engine body, and the absolute height of the turbocharger is kept low. Therefore, a larger space is secured below the turbocharger among the space behind the engine body, the height of the turbocharger is kept low and the center of gravity of the engine body is lowered.

The turbocharger may be a first turbocharger, and the vehicle may further comprise a second turbocharger disposed below the first turbocharger. The second turbocharger may be provided with a second turbine provided to the exhaust passage, a second compressor provided to the intake passage, a second coupling shaft coupling the second turbine to the second compressor, and second bearings supporting the second coupling shaft. The second turbine may be provided with an impeller for being rotated by introduced exhaust gas, and a second turbine casing accommodating the impeller. The second turbine casing may be made of cast iron, and a capacity of the turbine casing of the first turbocharger may be larger than a capacity of the second turbine casing of the second turbocharger.

In this vehicle, the space is secured below the first turbocharger as described above. Therefore, the second turbocharger is disposed suitably below the first turbocharger, and these two turbochargers are used for increasing the turbocharging function.

In addition, the turbine casing of the first turbocharger with the larger capacity is formed from the sheet metal, the second turbocharger with the smaller capacity is made of cast iron and is disposed below the first turbocharger. Thus, the heat capacity of the first turbine casing, which has a large surface area exposed to hot exhaust gas and tends to be increased in the temperature, is kept small so that the quantity of heat stored in the first turbine casing is reduced. Accordingly, the excessive temperature rise of the bearings of the first turbocharger immediately after the engine is stopped, etc., is controlled, the heat capacity of the second turbine casing of the second turbocharger is kept small by making it from cast iron and reducing the capacity, and the excessive temperature rise of the second bearings of the second turbocharger is controlled. In addition, since the second turbine casing of the second turbocharger located at the lower location is made of cast iron to relatively increase the weight, the center of gravity of the entire engine is securely lowered.

The second turbocharger may boost the engine only within a low speed range where an engine speed of the engine body is below a given reference speed, and the first turbocharger may boost the engine within an operating range at least including a high speed range where the engine speed of the engine body is above the reference speed.

In this vehicle, the center of gravity of the entire engine is lowered and the temperatures of the bearings of the turbochargers are kept low more effectively.

For example, since an exhaust flow rate (a quantity of exhaust gas that flows per unit time) increases within the high speed range where the engine speed is high, the turbocharger tends to be high in the temperature if it boosts the engine within this range. However, in this vehicle, within the high speed range where the engine speed is high, since the first turbocharger, which boosts the engine, has a the turbine casing formed from the sheet metal so that the heat capacity is reduced, the first turbocharger is prevented from excessively increasing in temperature. Therefore, when the engine is stopped after operating in the high speed range, the quantity of heat transmitted to the bearings from the turbine casing of the first turbocharger is reduced so that the excessive temperature rise of the bearings of the first turbocharger is controlled. On the other hand, within the low speed range where the engine speed is low and the temperature of exhaust gas (i.e., the temperature of the turbocharger) is easy to keep low, the second turbocharger having the second turbine casing which is made of cast iron and has the small capacity so that the excessive increase in the heat capacity is controlled, boosts the engine. Therefore, the excessive temperature rise of the bearings of the second turbocharger is also controlled.

In addition, since the second turbine casing of the second turbocharger is made of cast iron with a relatively high heat capacity, an excessive temperature fall of the second turbine casing is controlled. Therefore, a degradation of the boosting performance of the second turbocharger, which is caused by the excessive temperature fall, is controlled within the low speed range so that the high boosting performance is secured.

The turbocharger may be a first turbocharger, and the vehicle may further comprise a second turbocharger disposed below the first turbocharger. The second turbocharger may be provided with a second turbine provided to the exhaust passage, a second compressor provided to the intake passage, a second coupling shaft coupling the second turbine to the second compressor, and second bearings supporting the second coupling shaft. The second turbine may be provided with an impeller for being rotated by introduced exhaust gas, and a second turbine casing accommodating the impeller. The second turbine casing may be made of cast iron. The second turbocharger may boost the engine only within an operating range where an exhaust flow rate is less than a given reference flow rate, and the first turbocharger may boost the engine within an operating range at least including the operating range where the exhaust flow rate is more than the reference flow rate.

In this vehicle, the second turbocharger is disposed suitably below the first turbocharger, and these two turbochargers are used for increasing the turbocharging function.

In addition, the turbine casing of the first turbocharger, which tends to especially increase in temperature in connection with boosting the engine within the operating range where the exhaust flow rate is large, is formed from the sheet metal. That is, the heat capacity of the first turbine casing of the first turbocharger, which is exposed to a large amount of hot exhaust gas and tends to increase in temperature, is reduced. Therefore, the excessive temperature rise of the bearings of the first turbocharger immediately after the engine is stopped is controlled. In addition, the second turbine casing of the second turbocharger, which is difficult to excessively increase in temperature in connection with the boosting within the operating range where the exhaust flow rate is small, is made of cast iron and is disposed below the first turbocharger. Therefore, the excessive temperature rise of the bearings of the second turbine casing of the second turbocharger is controlled, the second turbine casing located at the lower side is made of cast iron so as to have the relatively large weight, and the center of gravity of the entire engine is lowered more securely, while providing the two turbochargers vertically to each other. In addition, since the second turbine casing of the second turbocharger is made of cast iron with the relatively high heat capacity, the excessive temperature fall of the second turbine casing is controlled. Therefore, a degradation of the boosting performance of the second turbocharger caused by the excessive temperature fall is controlled within the low speed range so that the high boosting performance is secured.

DETAILED DESCRIPTION OF EMBODIMENT

Hereinafter, a vehicle with a turbocharged engine according to one embodiment of the present invention is described in detail with reference to the accompanying drawings.

(1) Entire Engine Structure

A turbocharged engine 101 according to this embodiment is mounted on a vehicle, as a source of driving force, and is disposed inside an engine bay 100 (see FIG. 5) formed in a front part of the vehicle. Note that, as described herein, the directional terms, such as "front" or "forward," and "rear," "rearward" or "behind" refer to vehicle longitudinal or front-and-rear directions of the vehicle in its normal posture, "up," "above," or "upward," and "down," "below," or "downward" refer to vertical directions of the vehicle in the normal posture, and "left" or "leftward," and "right" or "rightward" refer to lateral, horizontal or vehicle width directions of the vehicle in the normal posture.

Figure 1:
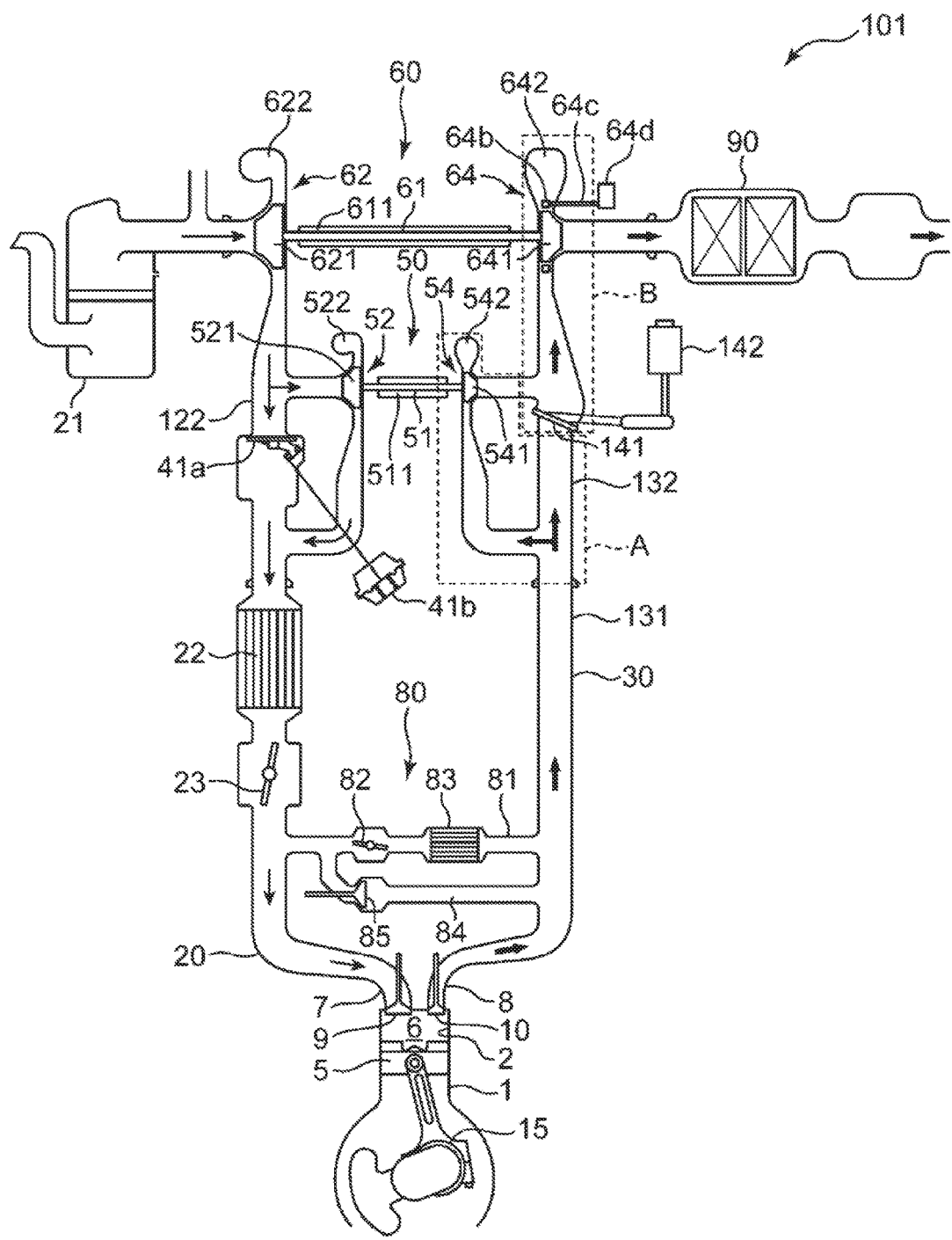
FIG. 1 is a view illustrating the entire structure of a turbocharged engine according to one embodiment of the present invention.

FIG. 1 is a system diagram illustrating the entire structure of the turbocharged engine 101. This engine system includes an engine body 1, an intake passage 20 through which air for combustion is introduced into the engine body 1, an exhaust passage 30 through which combusted gas (exhaust gas) generated inside the engine body 1 is discharged, a smaller turbocharger 50 (second turbocharger), a larger turbocharger 60 (first turbocharger), and an exhaust gas recirculation (EGR) device 80.

The smaller turbocharger 50 and the larger turbocharger 60 forcibly increase the intake air by use of energy of the exhaust gas, and have turbines 54 and 64 disposed in the exhaust passage 30, and compressors 52 and 62 disposed in the intake passage 20, respectively.

That is, the smaller turbocharger 50 includes the smaller turbine 54 (second turbine) disposed in the exhaust passage 30, and the smaller compressor 52 (second compressor) disposed in the intake passage 20, and also includes a smaller coupling shaft 51 (second coupling shaft) coupling the smaller turbine 54 to the smaller compressor 52, and a smaller bearings 511 (second bearings) supporting the smaller coupling shaft. The smaller turbine 54 includes a smaller turbine wheel 541 (impeller) which has a plurality of blades and is rotated by exhaust gas colliding with the blades, and a smaller turbine casing 542 accommodating the smaller turbine wheel 541. The smaller compressor 52 includes a smaller compressor wheel 521 (impeller) rotatably driven by the smaller turbine wheel 541, and a smaller compressor casing 522 accommodating the smaller compressor wheel 521.

Similarly, the larger turbocharger 60 includes the larger turbine 64 (turbine) disposed in the exhaust passage 30, and the larger compressor 62 (compressor) disposed in the intake passage 20, and also includes a larger coupling shaft 61 (coupling shaft) coupling the larger turbine 64 to the larger compressor 62, and larger bearings 611 (bearings) supporting the larger coupling shaft. The larger turbine 64 includes a larger turbine wheel 641 (impeller) which has a plurality of blades and is rotated by exhaust gas colliding with the blades, and a larger turbine casing 642 (turbine casing) accommodating the larger turbine wheel 641. The larger compressor 62 includes a larger compressor wheel 621 (impeller) rotatably driven by the larger turbine wheel 641, and a larger compressor casing 622 accommodating the larger compressor wheel 621.

In this embodiment, the capacity of the larger turbocharger 60, which is defined by the capacities of the larger compressor casing 622 and the larger turbine casing 642, is larger than the capacity of the smaller turbocharger 50, which is defined by the capacities of the smaller compressor casing 522 and the smaller turbine casing 542. Thus, the larger turbocharger 60 rotates the larger turbine 64 by exhaust gas with a larger flow rate than the smaller turbocharger 50 to speed-up the rotation of the larger compressor 62 so that a flow rate of intake air is increased.

In this embodiment, the larger turbine 64 is a VGT (Variable Geometry Turbine) and a plurality of nozzle vanes 64b of which an angle is changeable are provided around the larger turbine wheel 641. In addition, a rod 64c which cooperates with the nozzle vanes 64b, and a vane actuator 64d which drives the rod 64c in its axial directions to change the angle of the nozzle vanes 64b, are provided. When the nozzle vanes 64b are driven by the vane actuator 64d through the rod 64c in a closing direction (a direction in which the distance between adjacent nozzle vanes 64b is narrowed), a cross-sectional area of a channel through which exhaust gas flows into the larger turbine wheel 641 is reduced to increase a flow velocity of exhaust gas flowing into the larger turbine wheel 641.

On the other hand, the smaller turbine 54 is not provided with vanes, and thus it is a so-called FGT (Fixed Geometry Turbine) that is not changeable of the flow velocity of flow-in exhaust gas.

A plurality of cylinders 2 are formed in the engine body 1, and a piston 5 is reciprocatively fitted in each cylinder 2.

A combustion chamber 6 is defined above each piston 5, and fuel is injected into each combustion chamber 6 from a fuel injector (not illustrated). In this embodiment, the engine body 1 is a diesel engine in which the fuel injected from the fuel injector is mixed with air and then self-ignites within the combustion chamber 6. Each piston 5 is pushed downwardly by an expanding force caused by the combustion, and reciprocates vertically.

A crankshaft 15 which is an output shaft of the engine body 1 is disposed below the pistons 5. The crankshaft 15 is coupled to the pistons 5 through connecting rods, respectively, and rotates about a center axis thereof in accordance with the reciprocating motion of the pistons 5.

To the engine body 1 (more specifically, to a cylinder head), an intake port 7 for introducing air (intake air) supplied from the intake passage 20 into each cylinder 2, an exhaust port 8 for drawing exhaust gas generated in each cylinder 2 into the exhaust passage 30, an intake valve 9 which opens and closes each intake port 7, and an exhaust valve 10 which opens and closes each exhaust port 8, are provided.

The intake passage 20 is provided so as to be connected with each intake port 7. An air cleaner 21, the larger compressor 62, the smaller compressor 52, an intercooler 22, and a throttle valve 23 are provided to the intake passage 20 in this order from upstream.

The intake passage 20 is also provided with an intake bypass passage 122 through which intake air bypasses the smaller compressor 52 to downstream. For example, the intake bypass passage 122 communicates a portion of the intake passage 20 between the smaller compressor 52 and the larger compressor 62 with another portion of the intake passage 20 downstream from the smaller compressor 52.

The intake bypass passage 122 is provided with an intake bypass valve 41a which opens and closes the intake bypass passage 122. When the intake bypass valve 41a is fully-closed (the intake bypass passage 122 is closed), the entire quantity of intake air flows into the smaller compressor 52. On the other hand, when the intake bypass valve 41a is opened, at least a part of the intake air bypasses the smaller compressor 52 to flow downstream. Further, when the intake bypass valve 41a is fully opened, almost the entire quantity of the intake air bypasses the smaller compressor 52 to flow downstream. Thus, since the smaller compressor 52 functions as a resistance to the flow of intake air, the entire quantity of intake air flows into the intake bypass passage 122 having a less resistance when the intake bypass valve 41a is fully-opened. The intake bypass valve 41a is opened and closed by a negative-pressure intake valve actuator 41b.

The exhaust passage 30 is provided to be connected with each exhaust port 8 of the engine body 1. The exhaust passage 30 is provided with the smaller turbine 54, the larger turbine 64, and a catalytic device 90 in this order from upstream.

The exhaust passage 30 is also provided with an exhaust bypass passage 132 through which the exhaust gas bypasses the smaller turbine 54 to downstream. Thus, the exhaust bypass passage 132 communicates a portion of the exhaust passage 30 upstream of the smaller turbine 54 with another portion of the exhaust passage 30 between the smaller turbine 54 and the larger turbine 64.

The exhaust bypass passage 132 is provided with an exhaust bypass valve 141 which opens and closes the exhaust bypass passage 132. When the exhaust bypass valve 141 is fully-closed (the exhaust bypass passage 132 is closed), the entire quantity of exhaust gas flows into the smaller turbine 54 (when EGR gas is recirculated as will be described later, an entire quantity of gas which is obtained by subtracting the quantity of EGR gas from exhaust gas discharged from the engine body 1). On the other hand, when the exhaust bypass valve 141 is opened, at least a part of the exhaust gas bypasses the smaller turbine 54 to flow downstream. Further, when the exhaust bypass valve 141 is fully-opened, almost the entire quantity of exhaust gas bypasses the smaller turbine 54 to flow downstream. That is, since the smaller turbine 54 is a resistance to the flow of exhaust gas, the entire quantity of exhaust gas passes through the exhaust bypass passage 132 having a less resistance and flows downstream without passing through the smaller turbine 54 when the exhaust bypass valve 141 is fully-opened.

The exhaust bypass valve 141 is opened and closed by an exhaust valve actuator 142. In this embodiment, the exhaust valve actuator 142 is provided with an electric motor (not illustrated) for driving the exhaust bypass valve 141.

Note that in this embodiment, a so-called wastegate passage which is a passage for discharging exhaust gas outside without passing through the turbines, and a so-called wastegate valve which is a valve for opening and closing the wastegate passage, are not provided. Thus, the entire quantity of exhaust gas always flows into the larger turbine 64.

The EGR device 80 is a device for recirculating a part of exhaust gas (EGR gas) discharged from the engine body 1 to intake air.

The EGR device 80 includes a first EGR passage 81 and a second EGR passage 84 which communicate the exhaust passage 30 with the intake passage 20, and a first EGR valve 82 and a second EGR valve 85 which open and close the first EGR passage 81 and the second EGR passage 84, respectively. The first EGR passage 81 is provided with an EGR cooler 83. EGR gas is cooled by the EGR cooler 83 on the way to the first EGR passage 81, and then flows into the intake passage 20. On the other hand, the second EGR passage 84 is not provided with an EGR cooler, and thus EGR gas after passing through the second EGR passage 84 flows into the intake passage 20 while it is still hot.

The first EGR passage 81 and the second EGR passage 84 communicate a portion of the exhaust passage 30 upstream from the upstream end of the exhaust bypass passage 132 with a portion of the intake passage 20 downstream from the throttle valve 23, and exhaust gas before flowing into the turbines 54 and 64 is introduced into the EGR passages 81 and 84, respectively.

Figure 2:
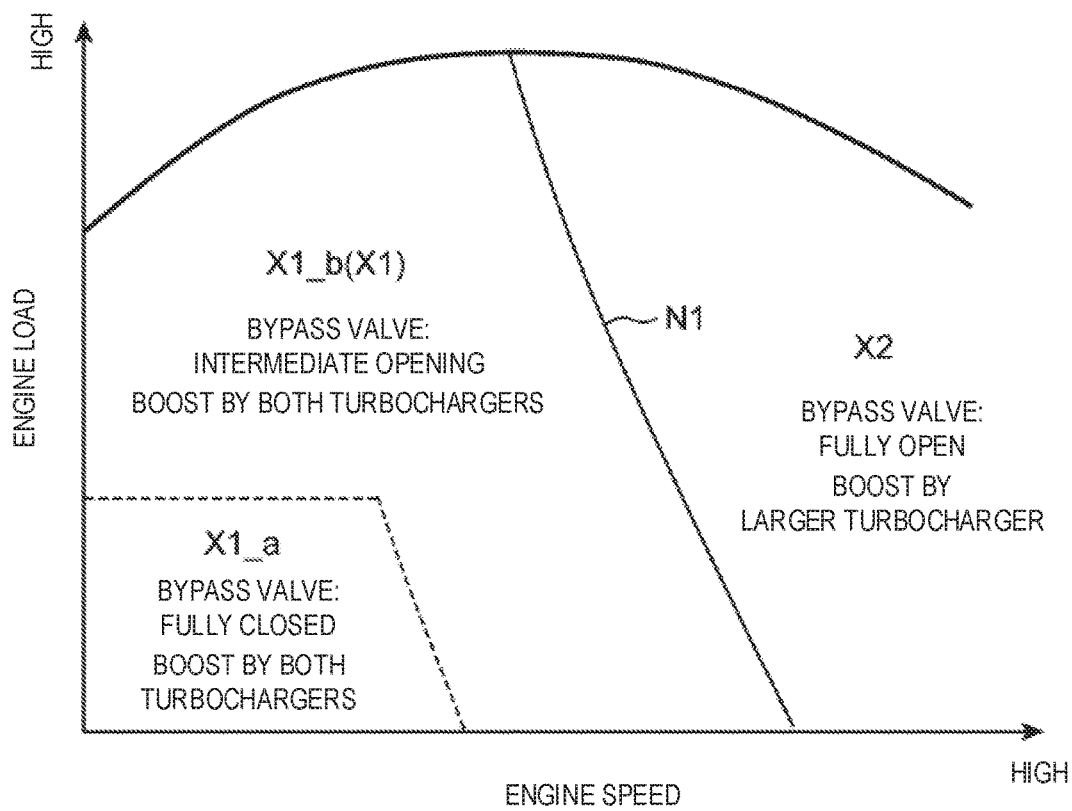
FIG. 2 is a chart illustrating an opening-and-closing range of an exhaust bypass valve.

The exhaust bypass valve 141 and the intake bypass valve 41a are controlled in such an engine system as illustrated in FIG. 2.

Within a low speed range X1 in which the engine speed is slower than a given reference speed N1 and an exhaust flow rate (a flow rate of exhaust gas discharged from the engine body 1) is less than a reference flow rate, the exhaust bypass valve 141 and the intake bypass valve 41a are controlled to have valve openings which are relatively closed from the fully-opened state so that a part of the exhaust gas flows into the smaller turbine 54 and a part of the intake air flows into the smaller compressor 52. Thus, within the low speed range X1, both the first turbocharger 60 and the second turbocharger 50 boost the engine. On the other hand, within a high speed range X2 in which the engine speed is faster than the reference speed N1, and the exhaust flow rate is greater than the reference flow rate, the exhaust bypass valve 141 and the intake bypass valve 41a are controlled to be fully-opened so that the entire quantity of exhaust gas bypasses the smaller turbine 54 to flow downstream, and the entire quantity of intake air bypasses the smaller compressor 52 to flow downstream. Thus, within the high speed range X2, only the larger turbocharger 60 boosts the engine.

As described above, in this embodiment, the smaller turbocharger 50 only boosts the engine within the low speed range X1, and the larger turbocharger 60 boosts the engine within all the operating ranges including the low speed range X1 and the high speed range X2.

Note that, in this embodiment, within a low-speed low-load range X1_a of the low speed range X1, where the engine speed and the engine load are low, the exhaust bypass valve 141 and the intake bypass valve 41a are controlled to be fully-closed so that the entire quantity of exhaust gas flows into the smaller turbine 54 and the entire quantity of intake air flows into the smaller compressor 52. On the other hand, within a range X1_b of the low speed range X1, where the engine speed and the engine load are relatively higher, the exhaust bypass valve 141 and the intake bypass valve 41a are controlled to be at intermediate openings (openings somewhere between the fully-closed state and the fully-opened state). Moreover, these bypass valves 141 and 41a (actuators 142 and 41b which drive the bypass valves 141 and 41a) and various devices are controlled by an Engine Control Unit (ECU; not illustrated) provided to the vehicle.

(2) Detailed Peripheral Structure of Turbochargers

Figure 3:
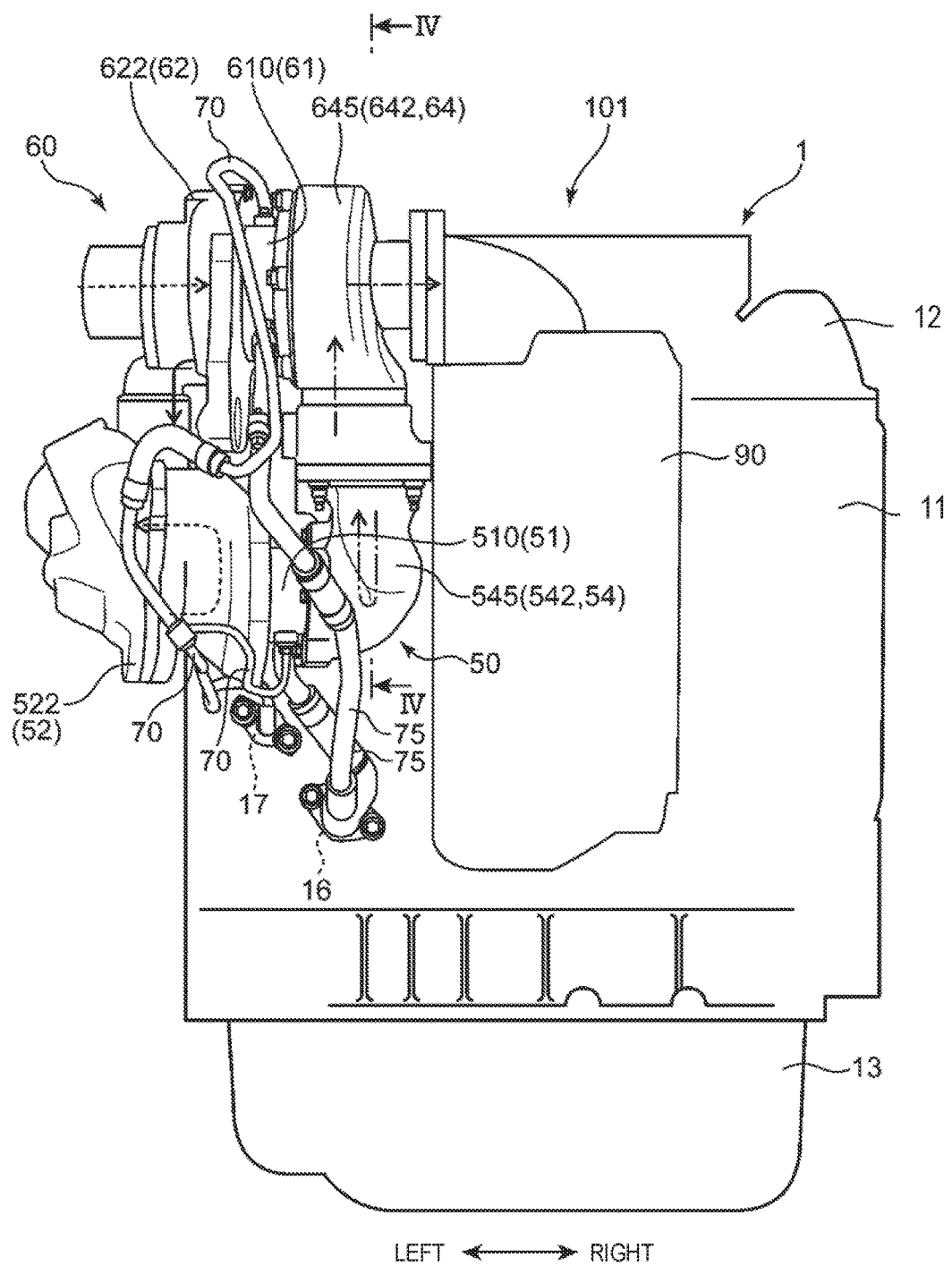
FIG. 3 is a view around an engine body, seen from a direction which intersects perpendicularly to the cylinder line-up direction.
Figure 4:
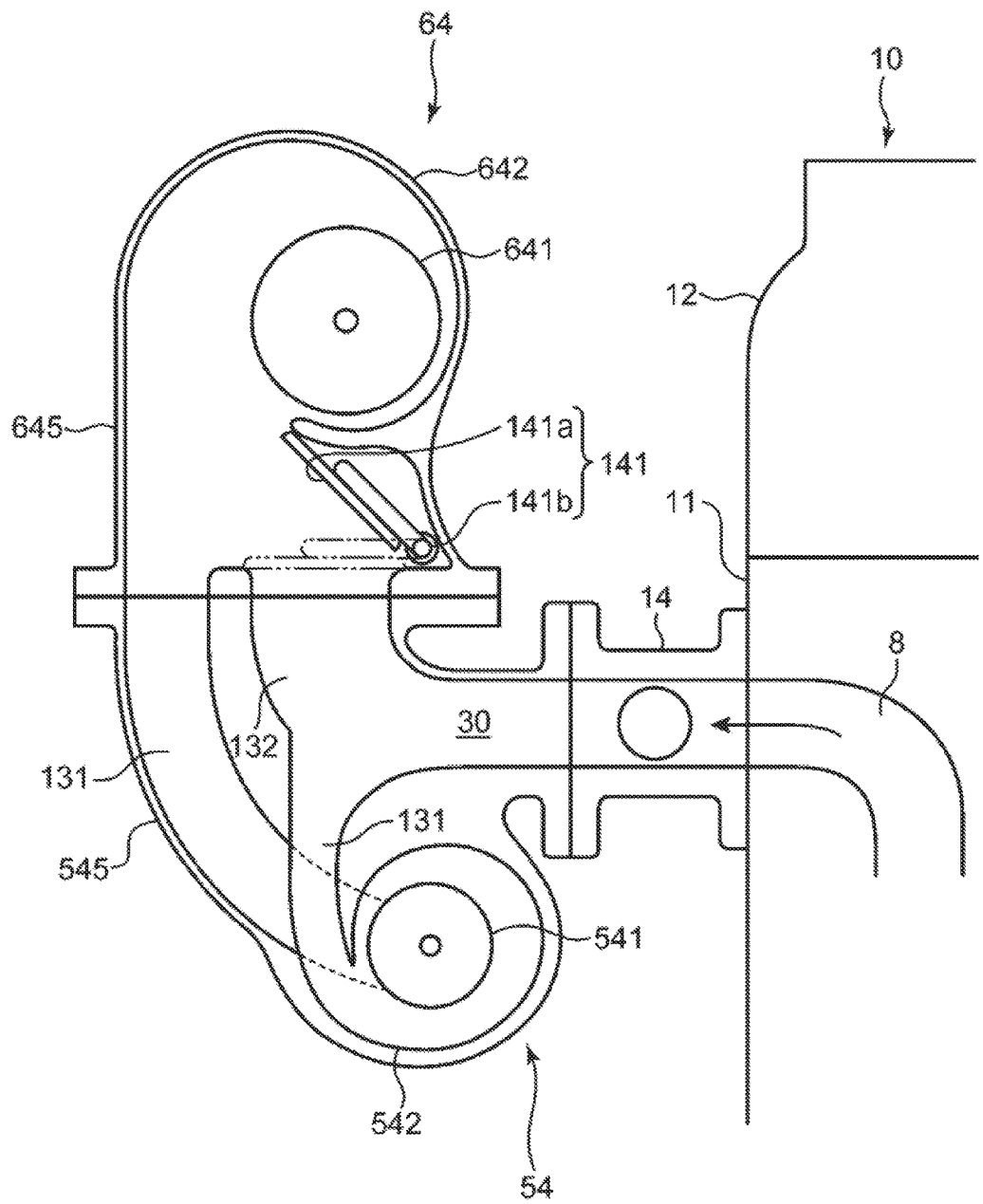
FIG. 4 is a cross-sectional view taken along a line IV-IV of FIG. 3.

Next, a structure around the turbochargers 50 and 60 is described in detail. FIG. 3 is a schematic view around the turbochargers 50 and 60, seen from rear. FIG. 4 is a cross-sectional view taken along a line IV-IV of FIG. 3.

In this embodiment, the first turbocharger 60 and the second turbocharger 50 are vertically disposed behind the engine body 1. That is, the larger turbocharger 60 is disposed above the smaller turbocharger 50, and the smaller turbocharger 50 is disposed below the larger turbocharger 60.

In addition, the turbochargers 50 and 60 are disposed so that the coupling shafts 51 and 61 extend laterally or horizontally, the compressors 52 and 62 are located on the left side of the coupling shafts 51 and 61, and the turbines 54 and 64 are located on the right side of the coupling shafts 51 and 61, respectively.

When the intake bypass valve 41a is closed, intake air flows toward the engine body 1 as illustrated by dashed-line arrows of FIG. 3. On the other hand, exhaust gas flows toward the catalytic device 90 as illustrated by chain-line arrows of FIG. 3. Note that as illustrated in FIG. 3, the catalytic device 90 is disposed on the right side of the turbines 54 and 64, and extends vertically.

The turbochargers 50 and 60 are disposed on the left side from the lateral center of the engine body 1, and in detail, the lateral centers of the turbochargers 50 and 60 are located on the left side from the lateral center of the engine body 1. In the illustrated example, the turbochargers 50 and 60 are disposed near the left end of the engine body 1.

In addition, in the example illustrated in FIG. 3, the turbochargers 50 and 60 are disposed within an area extending from almost the same height as an upper end of a head cover 12 to near the vertical center of a cylinder block 11.

As illustrated in FIG. 4, in this embodiment, a part of the exhaust passage 30, the exhaust bypass passage 132, and the smaller turbine casing 542 are integrally formed inside a smaller housing 545. That is, a portion illustrated by a character "A" in FIG. 1, which is a portion of the main passages 131 of the exhaust passage 30 passing through the smaller turbine 54, which extends from a location upstream of the upstream end of the exhaust bypass passage 132 to a location of the downstream end of the exhaust bypass passage 132, the exhaust bypass passage 132, and the smaller turbine casing 542 are commonly provided inside the smaller housing 545.

In addition, in this embodiment, a portion of the exhaust passage 30 extending from the downstream end of the exhaust bypass passage 132 to the larger turbine 64, and the larger turbine casing 642 are integrally formed and are provided inside a larger housing 645. That is, a portion illustrated by a character "B" in FIG. 1, which is a portion of the exhaust passage 30 extending from the downstream end of the exhaust bypass passage 132 and passing through the bypass valve 141 to the larger turbine 64, and the larger turbine casing 642 are provided inside the larger housing 645.

The smaller housing 545 and the larger housing 645 are coupled to each other with bolts (not illustrated) so that the larger housing 645 is located above the smaller housing 545. These housings 545 and 645 are fixed to the engine body 1 by fixing the smaller housing 545 to an exhaust manifold 14 which is fixed to the rear surface of the cylinder block 11 with bolts (not illustrated).

The larger housing 645 including the larger turbine casing 642 is formed by a sheet metal. For example, the larger housing 645 may be formed by various kinds of steel sheet, which may be formed by way of cold rolling or heat rolling, or may be formed by a stainless-steel sheet, an aluminum-alloy sheet, or a copper-alloy sheet. Since the larger housing 645 is formed by the sheet metal, it has a small heat capacity, and has a characteristic in which it is difficult to take heat away from the exhaust gas and to increase in temperature.

On the other hand, the smaller housing 545 including the smaller turbine casing 542 is made of cast iron, which is formed by molding an iron-containing material. The cast iron may include various kinds of cast iron, which may be made of an iron alloy containing carbon and silicone, such as gray cast iron, white cast iron, and mottled cast iron. Since the smaller housing 545 is made of cast iron, it has a larger heat capacity, and has a characteristic in which it easily increases in temperature by receiving heat from exhaust gas.

As illustrated in FIG. 4, the exhaust bypass valve 141 is disposed inside the larger housing 645. The exhaust bypass valve 141 includes a valve body 141a which actually opens and closes the exhaust bypass passage 132, and a rotary shaft 141b which is rotatably driven by the exhaust valve actuator 142. The rotary shaft 141b supports the valve body 141a in a cantilevered fashion. Thus, when the rotary shaft 141b rotates on its axis, the valve body 141a also rotates about the center axis of the rotary shaft 141b to change its posture between a posture in which the exhaust bypass passage 132 is closed (chain lines of FIG. 4) and a posture in which the exhaust bypass passage 132 is opened (solid lines of FIG. 4).

The smaller coupling shaft 51 and the smaller bearings 511 of the smaller turbocharger 50 are accommodated in a small center housing 510 disposed between the smaller compressor casing 522 and the smaller turbine casing 542. Similarly, the larger coupling shaft 61 and the larger bearings 611 of the larger turbocharger 60 are accommodated in a larger center housing 610 disposed between the larger compressor casing 622 and the larger turbine casing 642.

These center housings 510 and 610 are connected to oil pipes for supplying the lubricant to the bearings 511 and 611 of the coupling shafts 51 and 61, respectively. That is, the turbochargers 50 and 60 have the bearings 511 and 611 which rotatably support the coupling shafts 51 and 61 inside the center housings 510 and 610, respectively. The lubricant is supplied to bearing portions which are portions between the coupling shafts 51 and 61 and the bearings 511 and 611, respectively.

An oil gallery (not illustrated) where the lubricant circulates is formed inside the engine body 1 so that the lubricant is pumped by an oil pump (not illustrated) to be supplied to the oil gallery from an oil pan 13. An oil deriving part 17 is formed in an outer wall of the engine body 1, which communicates with the oil gallery and derives the lubricant outside. The oil deriving part 17 communicates with the center housings 510 and 610 of the turbochargers 50 and 60 via an oil supply pipe 70, respectively. Thus, a portion of the lubricant which flows inside the oil gallery passes through the oil deriving part 17 and the oil supply pipe 70, and is then supplied to parts around the bearings 511 and 611 accommodated in the center housings 510 and 610.

An oil recirculating part 16 is formed in an outer wall of the cylinder block 11, which communicates with a crank case provided inside the cylinder block 11. The oil recirculating part 16 communicates with the center housings 510 and 610 via a return pipe 75, respectively, so that the lubricant after lubricating the bearings of the turbochargers 50 and 60 is introduced into the crank case via the return pipe 75 and the oil recirculating part 16, and then returns to the oil pan 13.

As illustrated in FIG. 3, in this embodiment, in the larger turbocharger 60 provided at the upper side, the oil supply pipe 70 is connected to an upper surface of the larger center housing 610, and the return pipe 75 is connected to a lower end of the larger center housing 610. Thus, in the larger turbocharger 60, the lubricant is supplied into the larger center housing 610 from above, and is then discharged from below.

On the other hand, in the smaller turbocharger 50 provided at the lower side, the oil supply pipe 70 and the return pipe 75 are connected to a lower surface of the small center housing 510. Thus, in the smaller turbocharger 50, the lubricant is supplied into the small center housing 510 from below, and is the discharged from below.

The turbochargers 50 and 60 are oil-cooled by the lubricant, and oil supplied to the center housings 510 and 610 via the oil supply pipe 70 functions as coolant and also functions as the lubricant of the coupling shafts 51 and 61 and the bearings 511 and 611, respectively. Thus, coolant for cooling the coupling shafts 51 and 61 and the bearings 511 and 611 is not supplied to the center housings 510 and 610, but only the lubricant is supplied thereto. In other words, in the conventional turbocharger as disclosed in JP5494294B2, engine coolant is supplied, in addition to the lubricant, to the center housing which accommodates the coupling shaft of the turbocharger and the bearings thereof. On the other hand, in the turbocharged engine 101 of this embodiment, engine coolant is not supplied to the center housings 510 and 610, but oil is supplied thereto to serve as both the lubricant and coolant.

(3) Engine Mounting

Figure 5:
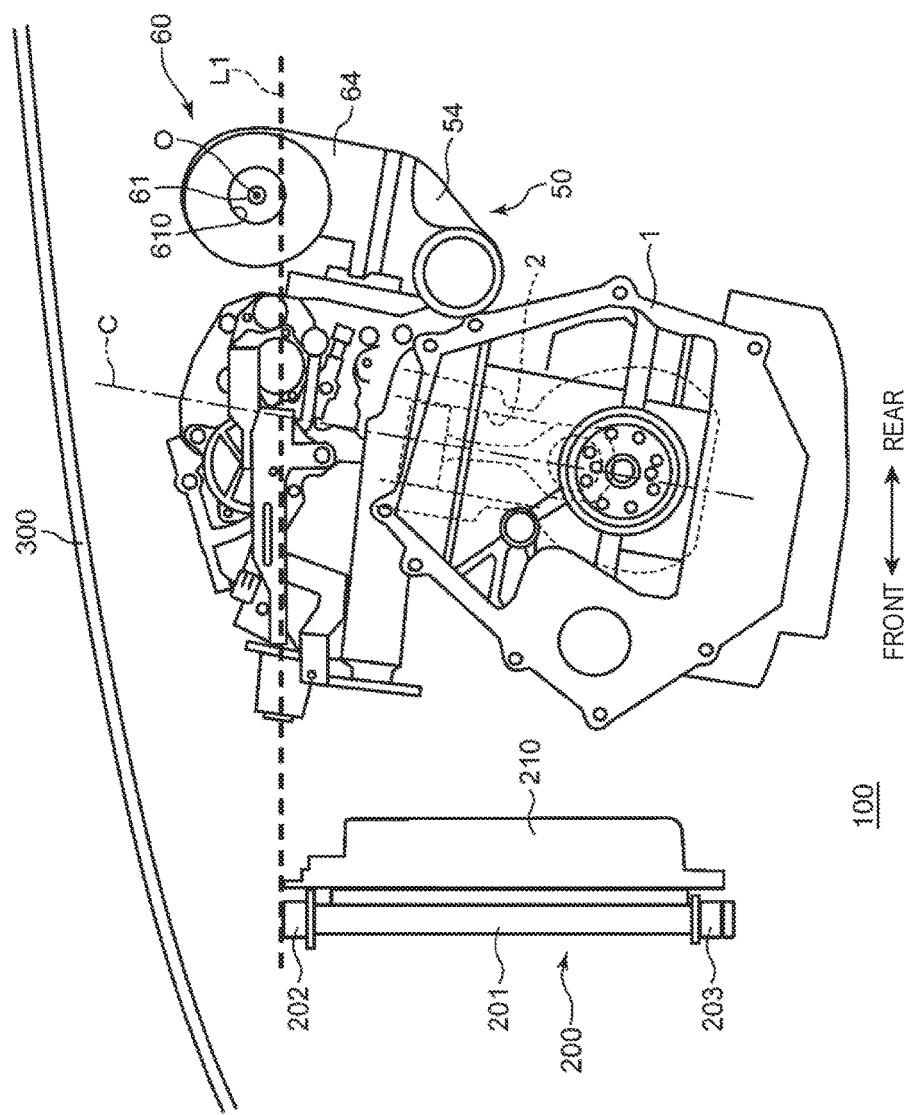
FIG. 5 is a side view schematically illustrating a state where the turbocharged engine is mounted on a vehicle.

The turbocharged engine 101 thus configured is mounted on the vehicle inside the engine bay 100 formed in the front part of the vehicle so that the lined-up direction of the cylinders 2 is oriented parallel to the lateral direction (i.e., directions perpendicular to the paper surface of FIG. 5). FIG. 5 is a schematic view inside the engine bay 100, seen from left.

A radiator 200 for cooling the engine coolant is disposed at a front end of the engine bay 100.

The radiator 200 includes a core 201 (cooling unit) which is formed with a great number of radiation fins and cools the engine coolant, an upper tank 202 provided above the core 201, and a lower tank 203 provided below the core 201. The core 201, the upper tank 202, and the lower tank 203 extend laterally, i.e., in directions perpendicular to the paper surface of FIG. 5. The upper tank 202 and the lower tank 203 are connected to a water jacket (not illustrated) formed in the engine body 1, through which the engine coolant passes. A pipe which derives the engine coolant from the water jacket is connected to the upper tank 202, and hot engine coolant after cooling the engine body 1 is introduced into the upper tank 202. The engine coolant flows from the upper tank 202 into the core 201, and is then cooled by a heat exchange of the core 201 with air, such as traveling wind. After the engine coolant is cooled, the engine coolant flows into the lower tank 203 and is then pumped by the water pump (not illustrated) from the lower tank 203 to the water jacket again. A cooling fan 210 is provided behind the radiator 200 and cools the engine coolant by sending air into the radiator 200 even when no traveling wind is obtained.

The engine body 1 is disposed behind the radiator 200 so that a center axis C of the cylinder 2 inclines upwardly and rearwardly, i.e., an upper part of the center axis C of the cylinder 2 inclines rearwardly. For example, the engine body 1 inclines rearwardly at about 10° with respect to the vertically upward direction.

The turbochargers 50 and 60 are disposed behind the rearwardly-inclined engine body 1. The turbochargers 50 and 60 are disposed at positions so that the height of the axial center of the larger coupling shaft 61 of the larger turbocharger 60 provided at the upper location is above the upper end of the upper tank 202. That is, an axial center O of the larger coupling shaft 61 of the larger turbocharger 60 is above a line L1 of FIG. 5, which is a horizontal line at the same height as the upper end of the upper tank 202. In this embodiment, as illustrated in FIG. 5, a lower end of the larger center housing 610 is about the same height as the line L1, and a difference in the height between the axial center O of the coupling shaft 61 of the larger turbocharger 60 and the line L1 is about 2 to 3 cm.

Note that numeral 300 in FIG. 5 indicates an engine hood.

(4) Operations

As described above, in the vehicle according to this embodiment to which the turbocharged engine 101 is mounted, the larger turbocharger 60 is disposed so that the height of the axial center O of the larger coupling shaft 61 is above the upper end of the upper tank 202. Thus, a larger space is secured below the larger turbocharger 60 so that the degree of freedom in the layout increases.

Especially, when the two turbochargers 50 and 60 are provided to the turbocharged engine 101 like this embodiment, the layout around the engine body 1 may be difficult. However, since the large space is secured below the larger turbocharger 60, the smaller turbocharger 50 is suitably disposed in this space. The turbochargers 50 and 60 are suitably disposed vertically to each other, around the engine body 1. Thus, this arrangement of the two turbochargers 50 and 60 increases the turbocharging pressure to increase the engine output.

Here, when the larger turbocharger 60 is disposed so that the height of the axial center O of the larger coupling shaft 61 is above the upper end of the upper tank 202, if the larger turbocharger 60 is structured so that it is cooled by the engine coolant, steam generated by the engine coolant being boiled within the larger center housing 610 which accommodates the larger coupling shaft 61 does not move to the upper tank 202 side, and thus the engine coolant may not suitably be supplied to the larger center housing 610.

On the other hand, in this embodiment, the turbine casing 642 of the larger turbocharger 60 is formed from the sheet metal and is structured to have the smaller heat capacity, and the larger turbocharger 60 is oil-cooled. Thus, the above arrangement is achieved, while suitably cooling the larger bearings 611 of the larger coupling shaft 61 of the larger turbocharger 60 immediately after the engine is stopped.

In other words, in this embodiment, because of the oil-cooling structure, discharging of steam from the larger center housing 610 is unnecessary, unlike the engine-coolant-cooling structure. However, since the cooling effect by the oil (lubricant) is less than the cooling effect of the engine coolant which is almost always cooled by the radiator 200, the larger bearings 611 and the larger coupling shaft 61 may not fully be cooled by simply structuring so that the larger bearings 611 of the larger turbocharger 60 are cooled by oil. On the other hand, since the larger turbine casing 642 is formed from the sheet metal and the heat capacity is small in this embodiment, the quantity of heat accumulated in the larger turbine casing 642 decreases immediately after the engine is stopped and the quantity of heat transmitted from the larger turbine casing 642 to the larger coupling shaft 61 and the larger bearings 611 decreases. Therefore, the larger bearings 611 and the larger coupling shaft 61 are suitably cooled, while having the oil-cooled structure.

Particularly, in this embodiment, the larger turbocharger 60 (larger turbine casing 642) having a larger capacity is formed from the sheet metal. The larger turbine casing 642 tends to be increased in the temperature because the capacity is large and the surface area exposed to hot exhaust gas is large; however, the temperature increase of the larger turbine casing 642 is effectively controlled to keep the temperatures of the larger bearings 611 and the larger coupling shaft 61 low. In addition, in this embodiment, the smaller turbine casing 542 of the smaller turbocharger 50, which is provided at the lower side and does not tend to be excessively increased in the temperature because of the smaller capacity, is made of cast iron to have the relatively large weight. Therefore, the center of gravity of the entire engine is lowered, while controlling the excessive temperature increases of the smaller bearings 511 and the smaller coupling shaft 51.

Further, in this embodiment, within the high speed range X2 where the temperatures of the turbochargers tend to be increased in connection with the larger exhaust flow rate, the engine boost is carried out only by the larger turbocharger 60, and, on the other hand, within the low speed range X1 where the temperatures of the turbochargers tend to be kept low, the engine boost is carried out by both the smaller turbocharger 50 and the larger turbocharger 60. That is, the larger turbocharger 60 boosts the engine in all the engine speed ranges, and the smaller turbocharger 50 boosts the engine only within the low speed range X1. In addition, the larger turbine casing 642 of the larger turbocharger 60 is formed from the sheet metal of which the heat capacity is small, while the smaller turbine casing 542 of the smaller turbocharger 50 is made of cast iron.

Therefore, the temperature of the larger turbine casing 642 of the larger turbocharger 60 which tends to be increased in the temperature is effectively kept low by boosting the engine in all the engine speed ranges including the high speed range X2 where the larger turbine casing 642 is exposed to a large amount of hot exhaust gas. Therefore, the quantity of heat transmitted from the larger turbine casing 642 of the larger turbocharger 60 to the larger coupling shaft 61 and the larger bearings 611 immediately after the engine is stopped etc. is kept small, and the excessive increases in the temperatures of the larger bearings 611 and the larger coupling shaft 61 are controlled. In addition, the temperature increase of the smaller turbocharger 50 which is exposed to the large amount of hot exhaust gas is controlled, and at the same time, the excessive temperature increases of the smaller bearings 511 and the smaller coupling shaft 51 immediately after the engine is stopped, etc. are controlled. On the other hand, since the exhaust flow rate is small within the low speed range X1, the temperature of the smaller turbine casing 542 may not fully be increased. However, since the smaller turbine casing 542 of the smaller turbine 54 is made of cast iron with the relatively large heat capacity, the excessive fall in the temperature of the smaller turbine casing 542 of the smaller turbine 54 is controlled by carrying out a boost of the smaller turbine 54 only within the low speed range X1. Therefore, a degradation of the boosting performance of the smaller turbocharger 50 within the low speed range X1 caused by the excessive temperature fall is controlled, and high boosting performance is secured.

In addition, in this embodiment, the engine body 1 is mounted on the vehicle with the posture in which the upper part of the center axis C of the cylinder 2 inclines rearwardly. Therefore, a larger space is secured below the larger turbocharger 60 and behind the engine body 1, while preventing the absolute height of the larger turbocharger 60 from being excessively high. In addition, the center of gravity of the larger turbocharger 60, i.e., the center of gravity of the entire engine is lowered and, thus the engine is stabilized.

(5) Modifications

Although in the above embodiment the smaller turbocharger 50 is provided in addition to the larger turbocharger 60, the smaller turbocharger 50 may be omitted. However, if both the turbochargers 50 and 60 are provided, the turbocharging pressure and the engine output increase. If both the turbochargers 50 and 60 are provided around the engine body 1, a large space is needed around the engine body 1. In this embodiment, since the larger turbocharger 60 is disposed at a higher location with respect to the engine body 1 to secure a large space below the larger turbocharger 60, the two turbochargers 50 and 60 are securely and suitably disposed around the engine body 1.

Moreover, although in the embodiment the capacity of the larger turbocharger 60 (the capacity of the larger turbine casing 642) of which the turbine casing 642 is formed from the sheet metal is larger than the capacity of the smaller turbocharger 50 (the capacity of the smaller turbine casing 542) of which the turbine casing 542 is made of cast iron, the capacities are not limited to such a relation. In the larger turbocharger 60 with the large capacity (of the larger turbine casing 642), since the heat capacity increases, the larger bearings 611 of the larger turbocharger 60 immediately after the engine is stopped tend to increase in temperature. However, since the turbine casing 642 of this larger turbocharger 60 is formed from the sheet metal, the temperature of the larger bearings 611 of the larger turbocharger 60 immediately after the engine is stopped is effectively kept low.

Moreover, although in the embodiment the larger turbocharger 60 of which the turbine casing 642 is formed from the sheet metal boosts in all the areas including the high speed range X2 where the exhaust flow rate is large, and the smaller turbocharger 50 of which the turbine casing 542 is made of cast iron boosts only in the low speed range X1 where the exhaust flow rate is small, the boosting areas of the turbochargers are not limited to such a relation.

Moreover, although in the embodiment the smaller turbocharger 50 is oil-cooled, the smaller turbocharger 50 may be water-cooled so that engine coolant may be supplied to the small center housing 510.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
20 Intake Passage
30 Exhaust Passage
50 Smaller Turbocharger (Second Turbocharger)
51 Smaller Coupling Shaft (Second Coupling Shaft)
52 Smaller Compressor (Second Compressor)
54 Smaller Turbine (Second Turbine)
60 Larger Turbocharger (Turbocharger, First Turbocharger)
61 Larger Coupling Shaft (Coupling Shaft)
62 Larger Compressor (Compressor)
64 Larger Turbine (Turbine)
101 Turbocharged Engine
200 Radiator
202 Upper Tank
511 Smaller Bearing (Second Bearing)
542 Smaller Turbine Casing (Second Turbine Casing)
611 Larger Bearing (Bearing)
642 Larger Turbine Casing (Turbine Casing)

What is claimed is:

1. A vehicle with a turbocharged engine, comprising:
an engine body where a cylinder is formed;
an intake passage where intake air to be introduced into the engine body flows;
an exhaust passage where exhaust gas discharged from the engine body flows;
a first turbocharger for boosting the intake air supplied to the engine body;
a second turbocharger stacked below the first turbocharger; and
a radiator for cooling engine coolant for cooling the engine body, the radiator being provided with a cooler for cooling the engine coolant, and an upper tank provided to an upper part of the cooler and into which the engine coolant is introduced after cooling the engine body, wherein
the first turbocharger is provided with a first turbine provided to the exhaust passage, a first compressor provided to the intake passage, a first coupling shaft coupling the first turbine to the first compressor, and first bearings supporting the first coupling shaft,
the first turbine is provided with a first impeller for being rotated by introduced exhaust gas, and a first turbine casing accommodating the first impeller, the first turbocharger is oil-cooled, and cooled only by an oil lubricant, the first turbine casing is formed from a sheet metal, the first coupling shaft of the first turbocharger extends horizontally, and a height of an axial center of the first coupling shaft is above a height of an upper end of the upper tank of the radiator, the second turbocharger is provided with a second turbine provided to the exhaust passage, a second compressor provided to the intake passage, a second coupling shaft coupling the second turbine to the second compressor, and second bearings supporting the second coupling shaft, the second turbocharger is provided with a second impeller for being rotated by introduced exhaust gas, and a second turbine casing accommodating the second impeller, the second turbocharger is oil-cooled, and cooled only by an oil lubricant, the second turbine casing is made of cast iron, and a volume of the first turbine casing of the first turbocharger is larger than a volume of the second turbine casing of the second turbocharger.

2. The vehicle of claim 1, wherein the first turbocharger is disposed behind the engine body, and the engine body is mounted on the vehicle in a posture so that a center axis of the cylinder inclines rearwardly relative to the radiator.

3. The vehicle of claim 1, wherein the second turbocharger boosts the engine only within a low speed range where an engine speed of the engine body is below a given reference speed, and the first turbocharger boosts the engine within an operating range at least including a high speed range where the engine speed of the engine body is above the reference speed.

4. The vehicle of claim 1, wherein the second turbocharger boosts the engine only within an operating range where an exhaust flow rate is less than a given reference flow rate, and the first turbocharger boosts the engine within an operating range at least including an operating range where the exhaust flow rate is more than the reference flow rate.

* * * * *